Dec. 16, 1924.

W. F. FRASER

TEMPERATURE INDICATOR

Filed June 7, 1922

1,519,676

Inventor:
Warren F. Fraser,
by Albert Davis
His Attorney.

Patented Dec. 16, 1924.

1,519,676

UNITED STATES PATENT OFFICE.

WARREN F. FRASER, OF WESTBORO, MASSACHUSETTS, ASSIGNOR TO GENERAL ELECTRIC COMPANY, A CORPORATION OF NEW YORK.

TEMPERATURE INDICATOR.

Application filed June 7, 1922. Serial No. 566,667.

*To all whom it may concern:*

Be it known that I, WARREN F. FRASER, a citizen of the United States, residing at Westboro, county of Worcester, State of Massachusetts, have invented certain new and useful Improvements in Temperature Indicators, of which the following is a specification.

My invention relates to temperature indicators and more particularly to temperature indicators adapted to reveal temperature conditions of encased electrical apparatus, such as transformers.

Much electrical apparatus which is subjected to large fluctuations in load is operated under such conditions as permit only occasional inspection. This is particularly true in the case of distribution transformers which are usually located in manholes, mounted on poles or otherwise operated where they can be given very little attention. An occasional or periodic inspection of such apparatus may reveal actual injury which may have been caused by overloads or otherwise, but overloads or faults in the apparatus which have cause such a degree of heat as to aproach more or less closely to dangerous conditions will not leave evidence which a subsequent inspection can reveal. It is often desirable, too, to be able to obtain records of past conditions in such apparatus, even though such conditions may not have reached the danger point. The general object of the present invention is to provide an improved form of heat indicating device which possesses these advantages.

Figure 1:
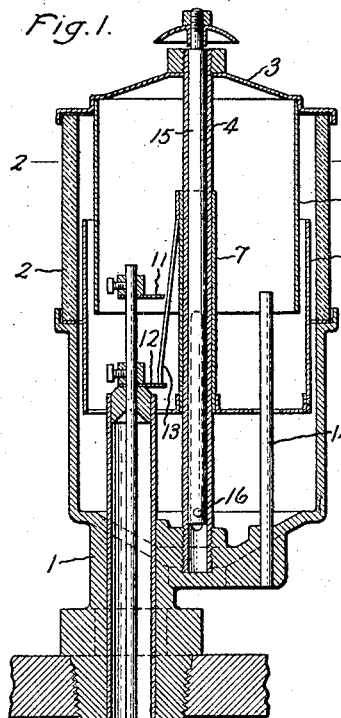
Figures 3, 6:
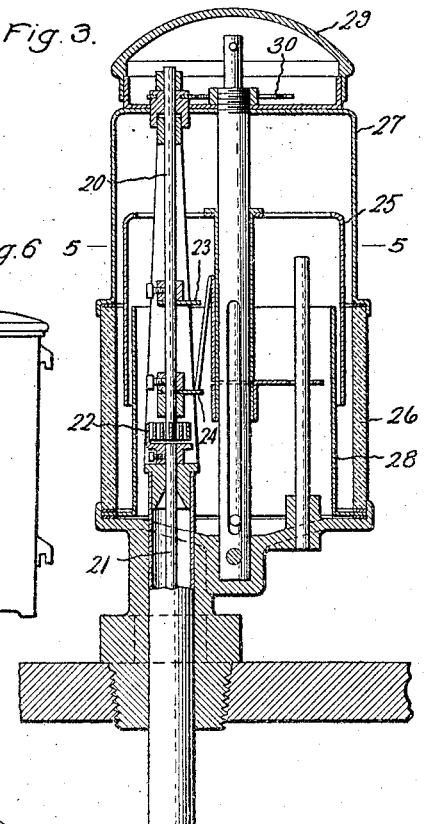
Figure 4:
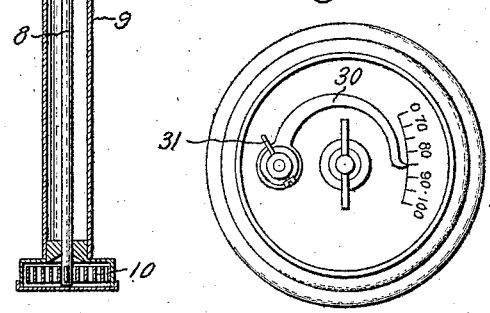
Figure 2:
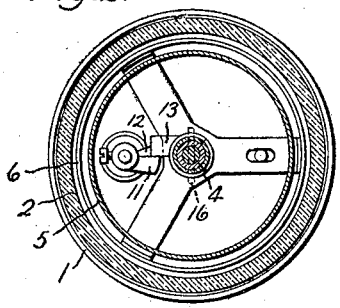
Figure 5:
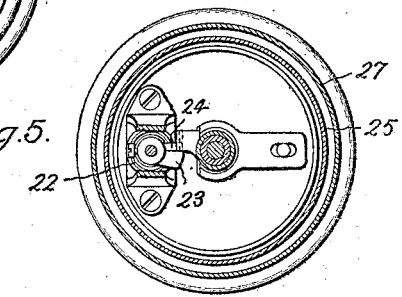

Other objects and advantages will appear from the following description taken in connection with the accompanying drawing in which Fig. 1 is a vertical sectional view of one form of the invention; Fig. 2 is a sectional view on the line 2—2 of Fig. 1; Fig. 3 is a view, mainly in vertical section, of another form of the invention; Fig. 4 is a top plan view of the indicator shown in Fig. 3 with the cap removed; Fig. 5 is a sectional view on the line 5—5 of Fig. 3; Fig. 6 shows a transformer casing equipped with the form of the invention shown in Fig. 3.

In the embodiment of the invention shown in Figs. 1 and 2, the indicator includes a base 1 threaded into the casing of a piece of electrical apparatus such as a transformer. The upper portion of the base is cup shaped and its upper edge supports a cylinder 2 of glass or other transparent material. The top of the cylinder is closed by a cap 3 and the cap, cylinder and base are held together by a tube 4 to form the outside casing of the indicator. Inside the glass cylinder 2 is a second fixed cylinder or signaling means 5 which is preferably brightly colored to give it high visibility so that it may be easily seen from a distance. A third cylinder 6 is supported from a sleeve 7 which slides vertically upon the tube 4, the cylinder 6 moving freely within a small space between the cylinders 2 and 5 and being guided by the tube 4. A rod 8 is arranged to rotate within a tube 9 passing through and secured in the base of the indicator. The lower ends of the rod 8 and tube 9 are connected by a spiral thermostat 10 which is arranged to be influenced by the temperature of the insulating liquid or other medium surrounding the apparatus within the casing, this thermostat serving to rotate the rod 8 in accordance with the surrounding temperature changes. The cylinder 6 is colored differently from the cylinder 5 and is preferably given some dark color, such as black, so that its position with reference to the brightly colored cylinder 5 may be easily observed. Near the upper end of the rod 8 are two adjustable stops 11 and 12 which are arranged to be engaged by the lower end of a finger 13 secured to the sleeve 7. The upper stop 11 is adjusted so that under normal temperature conditions surrounding the thermostat 10 the finger 13 may engage this stop 11 and support the cylinder 6 in its highest position so as to conceal entirely the brightly colored cylinder 5. The stop 11 is further adjusted so that at some predetermined temperature it may be rotated by the thermostat itself from under the finger 13 to allow the cylinder 6 to drop partway down until the finger 13 comes into engagement with the lower stop 12. This adjustment of the upper stop 11 may be such as to indicate that the temperature conditions surrounding the thermostat 10 have approached a danger point. Upon further increase of the temperature and further rotation of the rod 8 and the stops 11 and 12, the adjustment of the lower stop 12 is such that it will be in turn carried beyond the finger 13 to allow the cylinder 6 to drop to its lowest position when all of the brightly colored cylinder 5 will be revealed. This latter position of the cylinder 6 may indicate that the temperature has reached the danger point. A fixed post 14 engaging the support for the cylinder 6 prevents rotation of this cylinder which would otherwise be caused by friction between the finger 13 and the stops 11 and 12. The cylinder 6 may be reset to conceal the cylinder 2 by means of a rod 15, carrying a pin 16 arranged to engage the lower end of the sleeve 7.

The form of indicator shown in Figs. 3, 4 and 5 is similar to that shown in Figs. 1 and 2. In this form, however, the rod which is operated by the thermostat is formed in two aligned parts 20 and 21 which are connected together by a second thermostat 22. This thermostat 22 is influenced by the temperature of the air outside the casing of the electrical apparatus. In case of a transformer, for instance, which is immersed in insulating liquid, the temperature of the liquid alone is not a correct indication of the temperature of the transformer windings, inasmuch as the temperature of the liquid is influenced both by the heat generated in the windings and also by the temperature of the air surrounding the transformer casing. The heat generated in the windings is transferred to the surrounding liquid and thence dissipated through the casing to the outside air. The heat will be dissipated more rapidly when the surrounding air is cool than when it is warm and consequently the temperature of the liquid in which the transformer is immersed will not always be the same for a given maximum safe temperature in the windings. The thermostat 22 is provided to compensate for varying temperatures of the outside air so that, as a result of the combined effect of the two thermostats, the indicator will operate in accordance with predetermined temperatures in the transformer windings rather than in accordance with the temperature of the surrounding liquid. The stops 23 and 24 shown in Figs. 3 and 5 are carried by the part 20 of the thermostat operated rod so that these stops are rotated and the cylinder 25 is dropped in response to the combined influence of the temperatures of the liquid inside and of the air outside of the casing. In this form of the invention the casing of the indicator is arranged with the transparent glass cylinder 26 below and an inverted-cup shaped portion 27 above. The movable cylinder 25 in this case is the brightly colored one and moves freely between a transparent cylinder 26 and an inside cylinder 28, the former constituting the signaling means and the latter being merely a background.

Above the upper portion 27 of the casing is a space protected by a cap 29 and within which is a pointer 30 moving over a temperature scale. This pointer is pivoted about the upper end of the portion 20 of the operating rod and is arranged to be engaged by a pin 31 fixed to the upper end of the rod. This pin 31 is not attached to the pointer 30, the arrangement being such that the pointer will always be left at the highest part of the scale to which it has been moved by the pin. While this maximum temperature indicating feature has been shown only in connection with the form of the invention disclosed in Figs. 3, 4 and 5, it is obvious that it may be easily used in combination with the other form of invention shown in Figs. 1 and 2.

This invention provides a simple and efficient temperature indicator which is well adapted to record for future inspection the occurrence of certain predetermined temperature conditions in electrical apparatus, particularly in transformers which are immersed in an insulating liquid. Its cylindrical form and other features of construction which have been described render it easily visible from considerable distances and from all desired directions so that it is admirably adapted for use in connection with transformers or other apparatus located in such places as are not easily accessible such as upon the poles of an electrical transmission or distribution line.

What I claim as new and desire to secure by Letters Patent of the United States, is:—

1. A temperature indicator including two rotatable rod members connected by a thermostat, a second thermostat connected to one of said members, a stop carried by the other of said members, and a signaling means, said stop being arranged to control the operation of said signaling means.

2. A temperature indicator including two rotatable rod members connected by a thermostat, a second thermostat connected to one of said members, a signaling means, and a plurality of stops arranged between one of said members and the signaling means to control the operation of the signaling in a plurality of steps.

3. A temperature indicator including a casing having a transparent portion, a cylindrical signaling means within said casing and surrounding a guide therefor, and thermostatic means to cause said signaling means to be displayed at the transparent portion of the casing.

4. A temperature indicator including a casing having cylindrical upper and lower portions, one of said portions being transparent, a cylindrical signaling means within said casing, and thermostatic means to cause said signaling means to be displayed at the transparent portion of the casing.

5. A temperature indicator including a cylindrical casing surrounding a central guide and having a transparent portion, a cylindrical signaling member surrounding said guide, a second cylindrical member surrounding said guide, and thermostatic means to cause one of said members to move along said guide to cause the signaling member to be displayed at the transparent portion of said cylindrical casing.

6. A temperature indicator including a cylindrical casing surrounding a central guide and having a transparent portion, a cylindrical signaling member surrounding said guide, a second cylindrical member surrounding said guide, means including a rotatable rod and a stop to maintain a relative position of said cylindrical members with the signaling member concealed, and thermostatic means to rotate said rod and stop to cause said signaling means to be displayed at the transparent portion of said cylindrical casing.

7. A temperature indicator for electrical apparatus immersed in an insulating medium within a casing, said indicator including two rotatable rod members connected by a thermostat responsive to temperature changes outside said casing, a second thermostat connected to one of said rod members and responsive to temperature changes of said insulating medium, and indicating means operable in one direction only by the other of said rod members to indicate the temperature corresponding to the extreme position of said latter rod member.

In witness whereof, I have hereunto set my hand this 31 day of May, 1922.

WARREN F. FRASER.